(12) United States Patent
Li et al.

(10) Patent No.: US 12,287,035 B2
(45) Date of Patent: Apr. 29, 2025

(54) SELF-COOLING DEVICE SEALED WITH MAGNETIC LIQUID

(71) Applicants: BEIJING JIAOTONG UNIVERSITY, Beijing (CN); TSINGHUA UNIVERSITY, Beijing (CN)

(72) Inventors: Decai Li, Beijing (CN); Zhibin Wang, Beijing (CN); Xinzhi He, Beijing (CN); Zulong Yang, Beijing (CN)

(73) Assignees: BEIJING JIAOTONG UNIVERSITY, Beijing (CN); TSINGHUA UNIVERSITY, Beijing (CN)

( * ) Notice: Subject to any disclaimer, the term of this patent is extended or adjusted under 35 U.S.C. 154(b) by 82 days.

(21) Appl. No.: 18/496,575

(22) Filed: Oct. 27, 2023

(65) Prior Publication Data

US 2024/0141999 A1  May 2, 2024

(30) Foreign Application Priority Data

Oct. 31, 2022  (CN) .......................... 202211346288.9

(51) Int. Cl.
*F16J 15/43* (2006.01)
*F16J 15/16* (2006.01)

(52) U.S. Cl.
CPC ............ *F16J 15/43* (2013.01); *F16J 15/162* (2013.01)

(58) Field of Classification Search
CPC ................... F16J 15/162; F16J 15/43
See application file for complete search history.

(56) References Cited

U.S. PATENT DOCUMENTS

| | | | | |
|---|---|---|---|---|
| 4,938,611 A | * | 7/1990 | Nii | ...... F16C 33/1035 384/107 |
| 7,338,049 B2 | * | 3/2008 | Li | ............ F16J 15/43 277/410 |
| 11,125,337 B1 | * | 9/2021 | Li | ........... F16J 15/162 |
| 11,174,947 B2 | * | 11/2021 | Li | ............ F16J 15/43 |
| 11,261,972 B1 | * | 3/2022 | Li | ........... F16J 15/3288 |
| 11,415,226 B1 | * | 8/2022 | Li | ............ F16J 15/403 |
| 2006/0043682 A1 | * | 3/2006 | Li | ............ F16J 15/43 277/410 |
| 2008/0211193 A1 | * | 9/2008 | Li | ............ F16J 15/43 277/410 |
| 2011/0193292 A1 | * | 8/2011 | Li | ............ F16J 15/43 277/410 |
| 2021/0123530 A1 | * | 4/2021 | Li | ............ F16J 15/43 |

FOREIGN PATENT DOCUMENTS

CN  104455463 A  *  3/2015  ............... F16J 15/43

* cited by examiner

*Primary Examiner* — Nicholas L Foster
(74) *Attorney, Agent, or Firm* — Hodgson Russ LLP

(57) ABSTRACT

Provided is a self-cooling device sealed with a magnetic liquid, related to the field of mechanical engineering sealing technology. The device includes: a tank body, a pole-tooth, a rotary shaft, a magnetic liquid, a first gasket ring, a second gasket ring, a first pole-shoe, a permanent magnet, a third gasket ring, a second pole-shoe, a fourth gasket ring, a fan, a bolt, an end cover, a second U-shape soaking rod, and a first U-shape soaking rod.

3 Claims, 1 Drawing Sheet

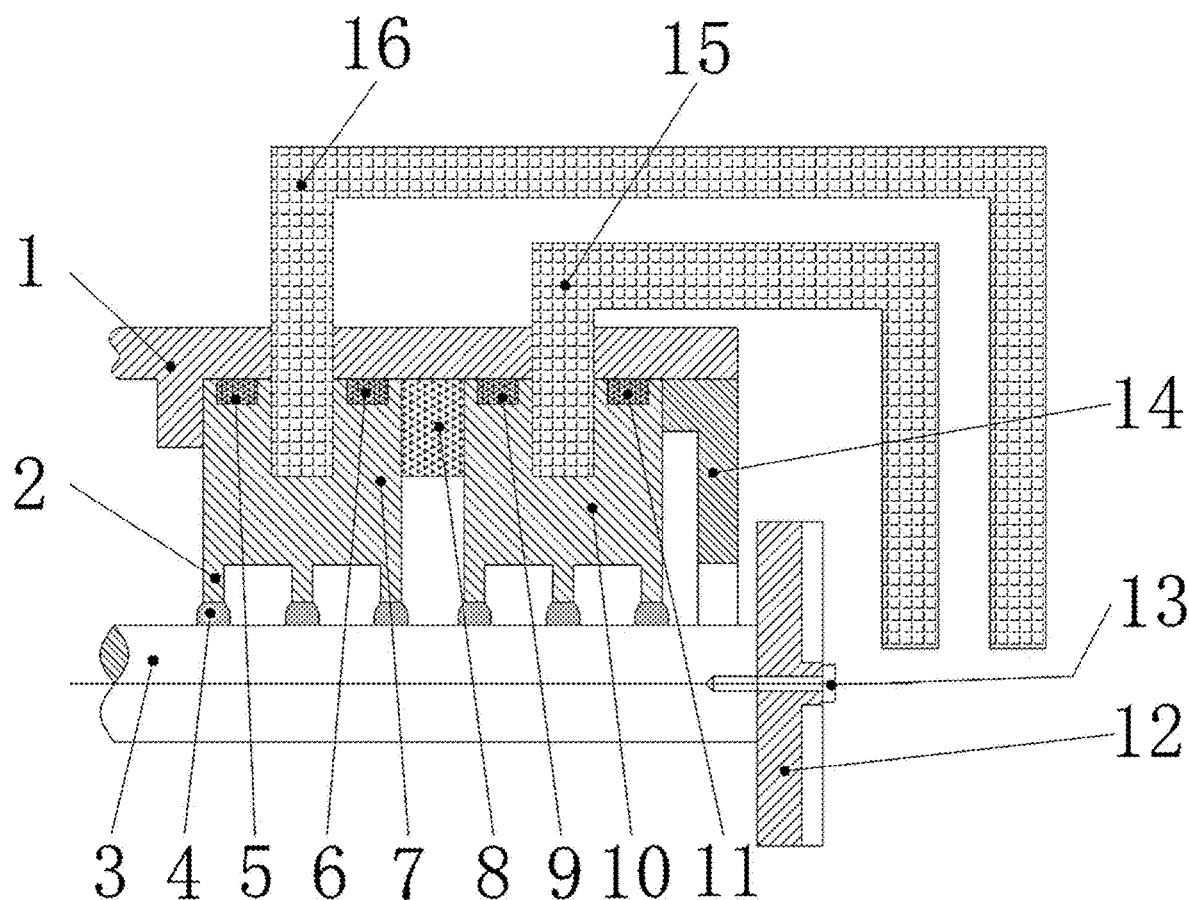

SELF-COOLING DEVICE SEALED WITH MAGNETIC LIQUID

CROSS-REFERENCE TO RELATED APPLICATIONS

This application is based on and claims priority to the Chinese Patent Application No. 202211346288.9, filed on Oct. 31, 2022, the entire content of which is incorporated herein by reference.

FIELD

The present disclosure relates to the field of mechanical engineering sealing technology, applicable to a device sealed with a magnetic liquid in need of reduced temperature increase.

BACKGROUND

In a magnetic fluid sealing device, the structure of a plurality of pole-teeth arranged at a pole-shoe results in an intensive-and-weak alternate magnetic gradient, such that a magnetic fluid is gathered under the pole-teeth, forming a sealing ring in an "0" shape for sealing. Even without direct contact between surfaces of the pole-teeth and the rotary shaft in the magnetic fluid sealing device, the magnetic fluid filled in a space to be sealed therebetween will be of an increasing temperature due to being subject to continuous shear. If such an increasing temperature achieves to an extent that adversely influences a service life and a pressure-resistant capacity of the magnetic fluid sealing device, an air or water cooling apparatus is additionally required for the traditional magnetic liquid sealing device, whose normal operation decides stable operation of the magnetic fluid sealing device. Thus, there is a need to provide a self-cooling device sealed with a magnetic liquid independent of an additional cooling apparatus, to reduce the increasing temperature for the magnetic fluid sealing device.

SUMMARY

An object of the present disclosure is to provide a self-cooling device sealed with a magnetic liquid.

The present disclosure provides in embodiments a self-cooling device sealed with a magnetic liquid, includes:
a tank body, a pole-tooth, a rotary shaft, the magnetic liquid, a first gasket ring, a second gasket ring, a first pole-shoe, a permanent magnet, a third gasket ring, a second pole-shoe, a fourth gasket ring, a fan, a bolt, an end cover, a second U-shape soaking rod, and a first U-shape soaking rod, wherein the first gasket ring and the second gasket ring are respectively installed in two circular grooves located at an exterior circumferential surface of the first pole-shoe, and the third gasket ring and the fourth gasket ring are respectively installed in two circular grooves located at an exterior circumferential surface of the second pole-shoe;

the first pole-shoe is provided with a first blind hole arranged in a radial direction between the two circular grooves at the exterior circumferential surface of the first pole-shoe;

the second pole-shoe is provided with a second blind hole arranged in the radial direction between the two circular grooves at the exterior circumferential surface of the second pole-shoe;

the first pole-shoe and the second pole-shoe each are provided with a plurality of the pole-teeth at respective interior circumferential surfaces;

the rotary shaft has a first end and a second end in an axial direction, wherein the fan is installed at the second end of the rotary shaft through the bolt;

the first pole-shoe, the permanent magnet, and the second pole-shoe are arranged at a radial side of the rotary shaft and installed in sequence in the axial direction from the first end to the second end of the rotary shaft inside the tank body;

the magnetic liquid is filled in a space to be sealed between a circumferential surface of the rotary shaft and the interior circumferential surfaces of the first pole-shoe and the second pole-shoe at the plurality of the pole-teeth;

the end cover is installed in the tank body via threaded connection, such that the first pole-shoe, the permanent magnet, and the second pole-shoe are pressed against the tank body by screwing the end cover;

the tank body is provided with a first through hole and a second through hole, which are arranged at a circumferential wall of the tank body and correspond to the first blind hole at the first pole-shoe and the second blind hole at the second pole-shoe respectively;

an end of the first U-shape soaking rod stretches into the first blind hole at the first pole-shoe through the first through hole at the circumferential wall of the tank body, serving as a first heat end;

an end of the second U-shape soaking rod stretches into the second blind hole at the second pole-shoe through the second through hole at the circumferential wall of the tank body, serving as a second heat end;

the first heat end of the first U-shape soaking rod is of a diameter less than that of the first through hole at the circumferential wall of the tank body, and the second heat end of the second U-shape soaking rod is of a diameter less than that of the second through hole at the circumferential wall of the tank body; and the first heat end of the first U-shape soaking rod and the second heat end of the second U-shape soaking rod are installed in the first blind hole at the first pole-shoe and the second blind hole at the second pole-shoe via interference fitting, respectively; and another end of the first U-shape soaking rod and another end of the second U-shape soaking rod, serving as a first cold end and a second cold end respectively, are arranged at where the fan blows.

BRIEF DESCRIPTION OF THE DRAWINGS

FIG. 1 is a schematic diagram showing a self-cooling device sealed with a magnetic liquid in an embodiment of the present disclosure.

REFERENCE SIGNS tank body (1), pole-tooth (2), rotary shaft (3), magnetic liquid (4), first gasket ring (5), second gasket ring (6), first pole-shoe (7), permanent magnet (8), third gasket ring (9), second pole-shoe (10), fourth gasket ring (11), fan (12), bolt (13), end cover (14), second U-shape soaking rod (15), and first U-shape soaking rod (16).

DETAILED DESCRIPTION

The present disclosure is further illustrated in specific embodiments in conjunction with attached drawings, however the following specific embodiments are only preferred embodiments of the present disclosure, but in no way construe any formal limitations on the present disclosure.

As shown in FIG. 1, the self-cooling device sealed with a magnetic liquid includes: a tank body (1), a pole-tooth (2), a rotary shaft (3), the magnetic liquid (4), a first gasket ring (5), a second gasket ring (6), a first pole-shoe (7), a permanent magnet (8), a third gasket ring (9), a second pole-shoe (10), a fourth gasket ring (11), a fan (12), a bolt (13), an end cover (14), a second U-shape soaking rod (15), and a first U-shape soaking rod (16), wherein the first gasket ring (5) and the second gasket ring (6) are respectively installed in two circular grooves located at an exterior circumferential surface of the first pole-shoe (7), and the third gasket ring (9) and the fourth gasket ring (11) are respectively installed in two circular grooves located at an exterior circumferential surface of the second pole-shoe (10);

the first pole-shoe (7) is provided with a first blind hole arranged in a radial direction between the two circular grooves at the exterior circumferential surface of the first pole-shoe (7);

the second pole-shoe (10) is provided with a second blind hole arranged in the radial direction between the two circular grooves at the exterior circumferential surface of the second pole-shoe (10);

the first pole-shoe (7) and the second pole-shoe (10) each are provided with a plurality of the pole-teeth (2) at respective interior circumferential surfaces;

the rotary shaft (3) has a first end and a second end in an axial direction, wherein the fan (12) is installed at the second end of the rotary shaft (3) through the bolt (13);

the first pole-shoe (7), the permanent magnet (8), and the second pole-shoe (10) are arranged at a radial side of the rotary shaft (3) and installed in sequence in the axial direction from the first end to the second end of the rotary shaft (3) inside the tank body (1);

the magnetic liquid (4) is filled in a space to be sealed between a circumferential surface of the rotary shaft (3) and the interior circumferential surfaces of the first pole-shoe (7) and the second pole-shoe (10) at the plurality of the pole-teeth;

the end cover (14) is installed in the tank body (1) via threaded connection, such that the first pole-shoe (7), the permanent magnet (8), and the second pole-shoe (10) are pressed against the tank body (1) by screwing the end cover (14);

the tank body (1) is provided with a first through hole and a second through hole, which are arranged at a circumferential wall of the tank body (1) and correspond to the first blind hole at the first pole-shoe (7) and the second blind hole at the second pole-shoe (10) respectively;

an end of the first U-shape soaking rod (16) stretches into the first blind hole at the first pole-shoe (7) through the first through hole at the circumferential wall of the tank body (1), serving as a first heat end;

an end of the second U-shape soaking rod (15) stretches into the second blind hole at the second pole-shoe (10) through the second through hole at the circumferential wall of the tank body (1), serving as a second heat end;

the first heat end of the first U-shape soaking rod (16) is of a diameter less than that of the first through hole at the circumferential wall of the tank body (1), and the second heat end of the second U-shape soaking rod (15) is of a diameter less than that of the second through hole at the circumferential wall of the tank body (1); and the first heat end of the first U-shape soaking rod (16) and the second heat end of the second U-shape soaking rod (15) are installed in the first blind hole at the first pole-shoe (7) and the second blind hole at the second pole-shoe (10) via interference fitting, respectively; and another end of the first U-shape soaking rod (16) and another end of the second U-shape soaking rod (15), serving as a first cold end and a second cold end respectively, are arranged at where the fan (12) blows.

The fan (12) is arranged to blow toward the first cold end and the second cold end. During rotation of the rotary shaft (3), the magnetic liquid (4) filled in the space to be sealed generates heat due to being subject to shear. A part of heat for the first pole-shoe (7) is transferred from the first heat end to the first cold end of the first U-shape soaking rod (16); while a part of heat for the second pole-shoe (10) is transferred from the second heat end to the second cold end of the second U-shape soaking rod (15). The fan rotating synchronously with the rotary shaft (3) blows toward the first cold end and the second cold end, thus taking the heat away from the first cold end of the first U-shape soaking rod (16) and the second cold end of the second U-shape soaking rod (15). The higher rotation speed of the rotary shaft (3) is, the more heat is generated from the magnetic liquid (4), the more heat is transferred to the first cold end of the first U-shape soaking rod (16) and the second cold end of the second U-shape soaking rod (15), and the higher rotation speed of the fan (12) is at the same time, the greater air quantity is generated, and the more heat is taken away, thereby reducing the increasing temperature for the magnetic liquid sealing device.

In an embodiment, the first pole-shoe (7), the second pole-shoe (10), and the rotary shaft (3) each are made of a permeability magnetic material; the tank body (1) is made of a non-permeability magnetic material; the permanent magnet (8) is of an axial magnetization direction; and the fan (12) is arranged to blow toward the first cold end and the second cold end.

In an embodiment, the first pole-shoe (7), the second pole-shoe (10), and the rotary shaft (3) each are made of 2Cr13; the tank body (1) is made of a non-permeability magnetic material; the permanent magnet (8) is of an axial magnetization direction, with an end away from the fan is the N-pole, while an end close to fan is the S-pole.

The magnetic circuit is composed as illustrated below: the magnetic field starts from the N-pole of the permanent magnet (8); passes through the first pole-shoe (7), the pole-teeth (2) at the first pole-shoe (7), the magnetic liquid (4) below the first pole-shoe (7), the rotary shaft (3), the magnetic liquid (4) below the second pole-shoe (10), the pole-teeth (2) at the second pole-shoe (10), and the second pole-shoe (10); and reaches the S-pole of the permanent magnet (8).

As compared to the conventional magnetic liquid sealing device, the self-cooling device sealed with a magnetic liquid in embodiments of the present disclosure is advantageous as below.

1. During rotation of the rotary shaft (3), the magnetic liquid (4) filled in the space to be sealed generates heat due to being subject to shear. A part of heat for the first pole-shoe (7) is transferred from the first heat end to the first cold end of the first U-shape soaking rod (16); while a part of heat for the second pole-shoe (10) is transferred from the second heat end to the second cold end of the second U-shape soaking rod (15). The fan rotating synchronously with the rotary shaft (3) blows toward the first cold end and the second cold end, thus taking the heat away from the first cold end of the first U-shape soaking rod (16) and the second cold end of the second U-shape soaking rod (15). The higher rotation speed of the rotary shaft (3) is, the more heat is generated from the magnetic liquid (4), the more heat is transferred to the first cold end of the first U-shape soaking rod (16) and the second cold end of the second U-shape soaking rod (15), and the higher rotation speed of the fan (12) is at the same time, the greater air quantity is generated, and the more heat is taken away, thereby reducing the increasing temperature for the magnetic liquid sealing device.

2. The fan (12) is rotated together with the rotary shaft (3), such that the stable operation of the self-cooling device sealed with a magnetic liquid is independent of an external cooling apparatus.

In the specification, it should be understood that, the terms indicating orientation or position relationship such as "central", "longitudinal", "lateral", "width", "thickness", "above", "below", "front", "rear", "right", "left", "vertical", "horizontal", "top", "bottom", "inner", "outer", "clockwise", "counter-clockwise", "axial", "radial", "circumferential" should be construed to refer to the orientation or position relationship as described or as shown in the drawings. These terms are merely for convenience and concision of description and do not alone indicate or imply that the device or element referred to must have a particular orientation or must be configured or operated in a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two this features, unless specified otherwise.

In the present disclosure, unless specified or limited otherwise, the terms "install", "connected", "coupled", "fixed" and the like are used broadly, and may be, for example, fixed connections, detachable connections, or integrated connections; may also be mechanical or electrical connections; may also be direct connections or indirect connections via intervening structures; may also be inner communications of two elements or mutual interaction between two elements, which can be understood by those skilled in the art according to specific situations.

In the present disclosure, unless specified or limited otherwise, a structure in which a first feature is "on" or "below" a second feature may be an embodiment in which the first feature is in direct contact with the second feature, or an embodiment in which the first feature and the second feature are contacted indirectly via an intermediation. Furthermore, a first feature "on", "above", or "on top of" a second feature may include an embodiment in which the first feature is right or obliquely "on", "above", or "on top of" the second feature, or just means that the first feature is at a height higher than that of the second feature; while a first feature "below", "under", or "on bottom of" a second feature may include an embodiment in which the first feature is right or obliquely "below", "under", or "on bottom of" the second feature, or just means that the first feature is at a height lower than that of the second feature.

Reference throughout this specification to "an embodiment", "some embodiments", "one embodiment", "another example", "an example", "a specific example", or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example", or "in some examples" in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

What is claimed is:

1. A self-cooling device sealed with a magnetic liquid, the device comprising: a tank body, a pole-tooth, a rotary shaft, the magnetic liquid, a first gasket ring, a second gasket ring, a first pole-shoe, a permanent magnet, a third gasket ring, a second pole-shoe, a fourth gasket ring, a fan, a bolt, an end cover, a second U-shape soaking rod, and a first U-shape soaking rod, wherein the first gasket ring and the second gasket ring are respectively installed in two circular grooves located at an exterior circumferential surface of the first pole-shoe, and the third gasket ring and the fourth gasket ring are respectively installed in two circular grooves located at an exterior circumferential surface of the second pole-shoe;

the first pole-shoe is provided with a first blind hole arranged in a radial direction between the two circular grooves at the exterior circumferential surface of the first pole-shoe;

the second pole-shoe is provided with a second blind hole arranged in the radial direction between the two circular grooves at the exterior circumferential surface of the second pole-shoe;

the first pole-shoe and the second pole-shoe each are provided with a plurality of pole-teeth at respective interior circumferential surfaces;

the rotary shaft has a first end and a second end in an axial direction, wherein the fan is installed at the second end of the rotary shaft through the bolt;

the first pole-shoe, the permanent magnet, and the second pole-shoe are arranged at a radial side of the rotary shaft and installed in sequence in the axial direction from the first end to the second end of the rotary shaft inside the tank body;

the magnetic liquid is filled in a space to be sealed between a circumferential surface of the rotary shaft and the interior circumferential surfaces of the first pole-shoe and the second pole-shoe at the plurality of pole-teeth;

the end cover is installed in the tank body via threaded connection, such that the first pole-shoe, the permanent magnet, and the second pole-shoe are pressed against the tank body by screwing the end cover;

the tank body is provided with a first through hole and a second through hole, which are arranged at a circumferential wall of the tank body and correspond to the first blind hole at the first pole-shoe and the second blind hole at the second pole-shoe respectively;

an end of the first U-shape soaking rod stretches into the first blind hole at the first pole-shoe through the first through hole at the circumferential wall of the tank body, serving as a first heat end;

an end of the second U-shape soaking rod stretches into the second blind hole at the second pole-shoe through the second through hole at the circumferential wall of the tank body, serving as a second heat end;

the first heat end of the first U-shape soaking rod is of a diameter less than that of the first through hole at the circumferential wall of the tank body, and the second heat end of the second U-shape soaking rod is of a diameter less than that of the second through hole at the circumferential wall of the tank body; and the first heat end of the first U-shape soaking rod and the second heat end of the second U-shape soaking rod are installed in the first blind hole at the first pole-shoe and the second blind hole at the second pole-shoe via interference fitting, respectively; and another end of the first U-shape soaking rod and another end of the second U-shape soaking rod, serving as a first cold end and a second cold end respectively, are arranged at where the fan blows.

2. The self-cooling device sealed with the magnetic liquid according to claim 1, wherein the first pole-shoe, the second pole-shoe, and the rotary shaft each are made of a permeability magnetic material; the tank body is made of a non-permeability magnetic material; and the permanent magnet is of an axial magnetization direction.

3. The self-cooling device sealed with the magnetic liquid according to claim 1, wherein:

the fan is arranged to blow toward the first cold end and the second cold end;

during rotation of the rotary shaft, the magnetic liquid filled in the space generates heat due to being subject to shear, wherein a part of heat for the first pole-shoe is transferred from the first heat end to the first cold end of the first U-shape soaking rod; while a part of heat for the second pole-shoe is transferred from the second heat end to the second cold end of the second U-shape soaking rod;

the fan rotating synchronously with the rotary shaft blows toward the first cold end and the second cold end, thereby taking the heat away from the first cold end of the first U-shape soaking rod and the second cold end of the second U-shape soaking rod; and the higher rotation speed of the rotary shaft is, the more heat is generated from the magnetic liquid, the more heat is transferred to the first cold end of the first U-shape soaking rod and the second cold end of the second U-shape soaking rod, and the higher rotation speed of the fan is at the same time, the greater air quantity is generated, and the more heat is taken away, thereby reducing the increasing temperature for the device.

* * * * *